(12) United States Patent
Olarig

(10) Patent No.: US 6,223,239 B1
(45) Date of Patent: Apr. 24, 2001

(54) DUAL PURPOSE APPARATUS, METHOD AND SYSTEM FOR ACCELERATED GRAPHICS PORT OR SYSTEM AREA NETWORK INTERFACE

(75) Inventor: Sompong Paul Olarig, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/133,788

(22) Filed: Aug. 12, 1998

(51) Int. Cl.⁷ .............................. G06F 13/00; G06F 13/38
(52) U.S. Cl. .............................. 710/129; 710/8; 710/100; 710/101; 710/121; 710/126; 712/16; 712/20; 712/11; 712/14; 712/15; 712/29; 345/501; 345/503; 345/514; 345/519; 345/520; 345/521; 345/526
(58) Field of Search ..................................... 710/129, 121, 710/126, 100, 101, 8; 712/16, 20, 14, 11, 15, 29; 711/202, 118, 206, 207, 147; 380/24, 4; 345/501, 514, 521, 526, 519, 520, 503

(56) References Cited

U.S. PATENT DOCUMENTS

| 5,479,627 | 12/1995 | Khalidi et al. . | |
|---|---|---|---|
| 5,542,055 | * 7/1996 | Amini et al. ........................ | 710/101 |
| 5,604,865 | * 2/1997 | Lentz et al. ......................... | 710/131 |
| 5,664,161 | 9/1997 | Fukushima et al. . | |
| 5,721,839 | * 2/1998 | Callison et al. ..................... | 710/128 |
| 5,740,381 | * 4/1998 | Yen ...................................... | 710/113 |
| 5,771,359 | * 6/1998 | Galloway et al. ................... | 710/128 |
| 5,790,831 | * 8/1998 | Lin et al. ............................. | 395/500 |
| 5,802,568 | 9/1998 | Csoppenszky . | |
| 5,812,789 | * 9/1998 | Diaz et al. ........................... | 709/247 |
| 5,828,854 | * 10/1998 | Wade .................................. | 710/128 |
| 5,828,865 | * 10/1998 | Bell ..................................... | 395/500 |
| 5,835,962 | 11/1998 | Chang et al. . | |
| 5,867,180 | * 2/1999 | Katayama et al. .................. | 345/512 |
| 5,911,051 | * 6/1999 | Carson et al. ....................... | 710/107 |

OTHER PUBLICATIONS

Halfhill, "Unclogging The PC Bottlenecks", BYTE Sep. 1997, vol. 22, No. 9.
Yong, "AGP Speeds 3D Graphics" *Microprocessor Report*-Jun. 17, 1996.
Brummer, "PCI–to–AGP Move Boosts 3–D Graphics" *Electronics Engineering Times*, 1997, N952, PG84.

\* cited by examiner

Primary Examiner—Ayaz Sheikh
Assistant Examiner—Frantz B. Jean
(74) Attorney, Agent, or Firm—Williams, Morgan & Amerson, P.C.

(57) ABSTRACT

A multiple use core logic chipset is provided in a computer system that may be configured either as a bridge between an accelerated graphics port ("AGP") bus and host and memory buses, or as a bridge between a system area network interface and the host bus and the system memory bus. The function of the multiple use chipset is determined at the time of manufacture of the computer system, or in the field whether an AGP bus bridge or a system area network interface is to be implemented. Selection of the type of bus bridge (AGP or system area network interface) in the multiple use core logic chipset may be implemented by a hardware signal input, or by software during computer system configuration or power on self test ("POST"). Software configuration may also be determined upon detection of either an AGP device or a system area network interface connected to the core logic chipset.

10 Claims, 3 Drawing Sheets

DUAL PURPOSE APPARATUS, METHOD AND SYSTEM FOR ACCELERATED GRAPHICS PORT OR SYSTEM AREA NETWORK INTERFACE

CROSS REFERENCE TO RELATED PATENT APPLICATIONS

This patent application is related to commonly owned U.S. patent applications Ser. No. 08/853,289; filed May 9, 1997; entitled "Dual Purpose Apparatus, Method And System For Accelerated Graphics Port And Peripheral Component Interconnect" by Ronald T. Horan and Sompong P. Olarig; Ser. No. 08/885,062; filed Jun. 30, 1997; entitled "Apparatus, Method And System For Dual Accelerated Graphics Ports" by Ronald T. Horan, Gary W. Thome and Sompong P. Olarig; Ser. No. 09/038,412; filed Mar. 11, 1998; entitled "Accelerated Graphics Port Programmable Memory Access Arbiter" by Ronald T. Horan, Phillip M. Jones, Gregory N. Santos, Robert Allan Lester and Gary J. Piccirillo; and Ser. No. 09/088,131; filed Jun. 1, 1998; entitled "Dual Purpose Apparatus, Method And System For Accelerated Graphics Port Or Second Memory Interface" by Sompong P. Olarig, all of the above mentioned applications are hereby incorporated by reference for all purposes.

BACKGROUND OF THE INVENTION

1. Field of the Invention

The present invention relates to computer systems using a core logic chipset to interface a central processor(s) (CPU), an AGP bus, input-output peripherals and random access memory together, and more particularly, in utilizing the same core logic circuits to provide a system area network interface through the AGP bus.

1. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A computer system has a plurality of information (data and address) buses such as a host bus, a memory bus, high speed expansion buses such as an Accelerated Graphics Port (AGP) bus, a Peripheral Component Interconnect (PCI) bus, and other peripheral buses such as the Small Computer System Interface (SCSI), Extension to Industry Standard Architecture (EISA), and Industry Standard Architecture (ISA). The processor(s) of the computer system communicates with main memory and with the peripherals that make up the computer system over these various buses.

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system's central processing unit ("CPU").

The peripheral devices' data transfer speeds are achieved by connecting the peripheral devices to the microprocessor(s) and associated system random access memory through high-speed expansion local buses. Most notably, a high speed expansion local bus standard has emerged that is microprocessor independent and has been embraced by a significant number of peripheral hardware manufacturers and software programmers. This high-speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference for all purposes. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and minicomputer systems. Some representative examples of these new microprocessors are the "PENTIUM" and "PENTIUM PRO" (registered trademarks of Intel Corporation). Advanced Micro Devices, Digital Equipment Corporation, Cyrix, IBM and Motorola also manufacture advanced microprocessors.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever-larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high-speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification, which provides signal, protocol, electrical, and mechanical specifications for the AGP bus and devices attached thereto. This specification is entitled "Accelerated Graphics Port Interface Specification version 2.0," dated May 4, 1998; and also "Accelerated Graphics Port Interface Specification version 1.0," dated Jul. 31, 1996 are hereby incorporated by reference for all purposes. The AGP specification, both versions 2.0 and 1.0, are available from Intel Corporation, Santa Clara, Calif.

The AGP interface specification uses the 66 MHz PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates in excess of 500 megabytes per second ("MB/sec.") using the AGP 2x mode. The remaining AGP specification does not modify the PCI 2.1 specification, but rather provides a range of graphics-oriented performance enhancements for use by the 3-D graphics hardware and software designers. The AGP specification is neither meant to replace or diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having a second random access memory interface.

AGP capabilities are very desirable in a personal computer utilizing 3-D graphics, however, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance and flexibility of use for any personal computer product must be maximized while constantly reducing its manufacturing costs. To achieve a high performance to cost ratio, commonality of components and high volume of use are important factors. Thus, commonality of components such as logic circuits, printed circuit boards, microprocessors, computer boxes and power supplies, will drive the costs down for both workstations and servers. In addition, the high-end workstations and network servers would benefit if one generic model of a personal computer could be effectively used in either capacity. Further benefits in reducing costs may be realized by using common components in portable and desktop (consumer and low-end business) computers.

Many personal computers are linked to networks that include other personal computers as well as file, web and database servers and other peripheral devices such as printers. Some of these networks are arranged in a client/server configuration where key information and processing is accomplished on a special server computer for broadcast to the requesting client (personal computer) and/or other personal computers on the network. The client/server arrangement relieves the client computer from several tasks. Client/server technology allows either smaller, less capable clients to be used, or enables more capable clients to perform other tasks and thereby enhance the capability of the network as a whole. Use of more capable clients in a client server network creates a market for "excess computing capacity." This capacity was underutilized for many years. However, within the last several years, a new technology has emerged to take advantage of the excess client computing capacity. This technology is called a system area network.

A system area network (SAN) is a specialized network that enables a higher level of interaction between the client PC and the network. Software applications that run on a SAN can utilize the idle capacity on various client PCs on a network. The PCs that run a SAN software application are grouped together in a "cluster." A cluster is defined as a group of autonomous servers that work together as a single processing resource in an application environment. Autonomous means that the individual servers have everything they need to be stand-alone—including processors, memory, and operating system software. Applications and data can reside anywhere within the cluster, but to the user or client application, a cluster appears as a single system and can be managed as such.

One of the nagging problems of parallel processing is the approach to shared memory. Symmetric multiprocessor (SMP) systems run many commercial applications, yet they have certain scalability constraints. These constraints arise because SMP systems, regardless of the operating system, are shared-memory machines. When memory and other resources are shared among multiple processors, the addition of processors after a certain point (usually six to eight) results in resource contention. In addition, with a shared-memory architecture, the fault domain is spread across the entire system. This means that if there is a memory failure (hardware or software induced), the whole system fails, resulting in serious availability problems.

The use of a clustering architecture is an alternative to scaling up a shared-memory architecture system. Clustering architecture has its roots in fault-tolerant, massively parallel computing. Clustering architecture provides greatly enhanced scalability and reliability through the use of multiple, small-scale (low cost) SMP nodes (including uniprocessor nodes).

Viewed as a stack, a cluster can be broken into key elements, beginning with the hardware platform. On top of that resides the interconnection or I/O subsystem architecture. Residing on this physical layer are the software elements, starting with the operating system, followed by cluster-aware middleware (database, transaction processing, messaging, and other critical services). All of the above is topped with the application software.

All of the elements mentioned above must collaborate seamlessly to enable an efficient, scalable, reliable cluster. The middleware must shield programmers and users from the complexities of a multiprocessor environment, the interconnect technology must support the hardware architecture. Furthermore, the software and the hardware, working together, must support predictable scalability. Ultimately, however, a cluster will be only as good as its weakest link. For example, event the fastest hardware will not perform up to desired levels if the software is cluster efficient. Similarly, the cluster will "under perform" if there are significant bottlenecks, such as network connections of limited speed.

Many elements are involved in clustering, and there are many ways to build a cluster. However, there are two fundamental architectural models—shared-disk and shared-nothing. A shared-disk cluster design enables processors to share access to a disk storage subsystem. To exchange information in a shared-disk architecture, message are sent at high speed between groups of processors. Unlike the shared-disk architecture, the shared-nothing cluster provides processors with their own memory and I/O channels. The advantage of the shared-nothing architecture is that processors are not called upon to settle resource contention (or wait idly while a contention is resolved on their behalf by other devices). Even in a shared-nothing environment, however, there are still many demands on the cluster.

A major step in the evolution of clustering was the development of low-overhead, low latency system area networks that can scale to meet the most demanding throughput requirements. The interconnect technology is the "nerve system" of a cluster, tying together all of its various components—multiple server nodes, storage resources, and I/O devices. There are many possible cluster interconnect technologies—ethernet, asynchronous transfer mode (ATM), and other high-speed channels. Traditional LAN and WAN technologies, however, are often too slow to be suitable cluster interconnects. Faster versions of these technologies can contribute significantly to the overall performance of the cluster. Increased bandwidth for input-output ("I/O"), and their associated busses, would greatly facilitate the utilization of parallel applications on a SAN.

What is needed is an apparatus and system for a personal computer that may provide a network interface to a SAN by utilizing multiple-use high production volume logic and interface circuits having the capability of providing either the SAN interface or an AGP interface.

SUMMARY OF THE INVENTION

The present invention overcomes the above-identified problems as well as other shortcomings and deficiencies of existing technologies by providing in a computer system a multiple use core logic chipset that may be configured to provide either an AGP bus interface or a PCI device that is a system area network interface. In an alternate embodiment, a system area network interface is connected to the AGP bus of the core logic as an AGP device. In a second alternate embodiment, the system area network interface is included within the core logic chipset in place of the AGP bus. In a third alternate embodiment, the core logic chipset includes both the system area network interface and the AGP bus.

In the preferred embodiment, the function of the multiple use chipset is determined at the time of manufacture of the computer system, or may be changed in the field to an AGP bus interface or a system area network interface. The core logic chipset has provisions for the AGP bus and system area network interface signals, and is adapted for connection to either the AGP bus or the system area network interface. Selection of which configuration (AGP or system area network interface) the core logic chipset of the present invention is to assume may be determined by the type of computer system printed circuit motherboard utilized with the core logic chipset, by software during computer system startup (POST), or during configuration of the computer system. The core logic chipset of the present invention uses one of its arbiters and has Request ("REQ") and Grant ("GNT") signal lines for the AGP device and each PCI device on the primary PCI bus.

The multiple use core logic chipset of the present invention may be used in conjunction with a specific use printed circuit motherboard for a workstation, personal computer, portable computer, or a network server. In this embodiment, the type of motherboard may be adapted to apply hardware signal inputs to the core logic chipset for determining the configuration (AGP or system area network interface) thereof. The multiple use core logic chipset may also be configured to provide the AGP or system area network interface by software selection and is within the scope of the present invention.

An advantage of the present invention is being able to use the same multiple use core logic chipset across different types of computer products. This feature increases the quantity of these chipsets being manufactured, thus resulting in a corresponding decrease in the cost per chipset.

As discussed above, the multiple use core logic chipset may have signal inputs for configuring whether it functions as an AGP interface or a PCI device such as a system area network interface. However, it is also contemplated in the present invention that the multiple use chipset may be software programmed to select either the AGP or the system area network interface function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program that performs the discovery process may be referred to as the PCI bus enumerator.

According to the PCI specification, all PCI devices must implement a base set of configuration registers. The PCI device may also implement other required or optional configuration registers defined in the PCI specification. The PCI specification also defines configuration registers and information to be contained therein for a PCI compliant device so as to indicate its capabilities and system requirements. Once the information for all of the bus devices is determined, the core logic may be configured as a system area network interface by the startup software.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
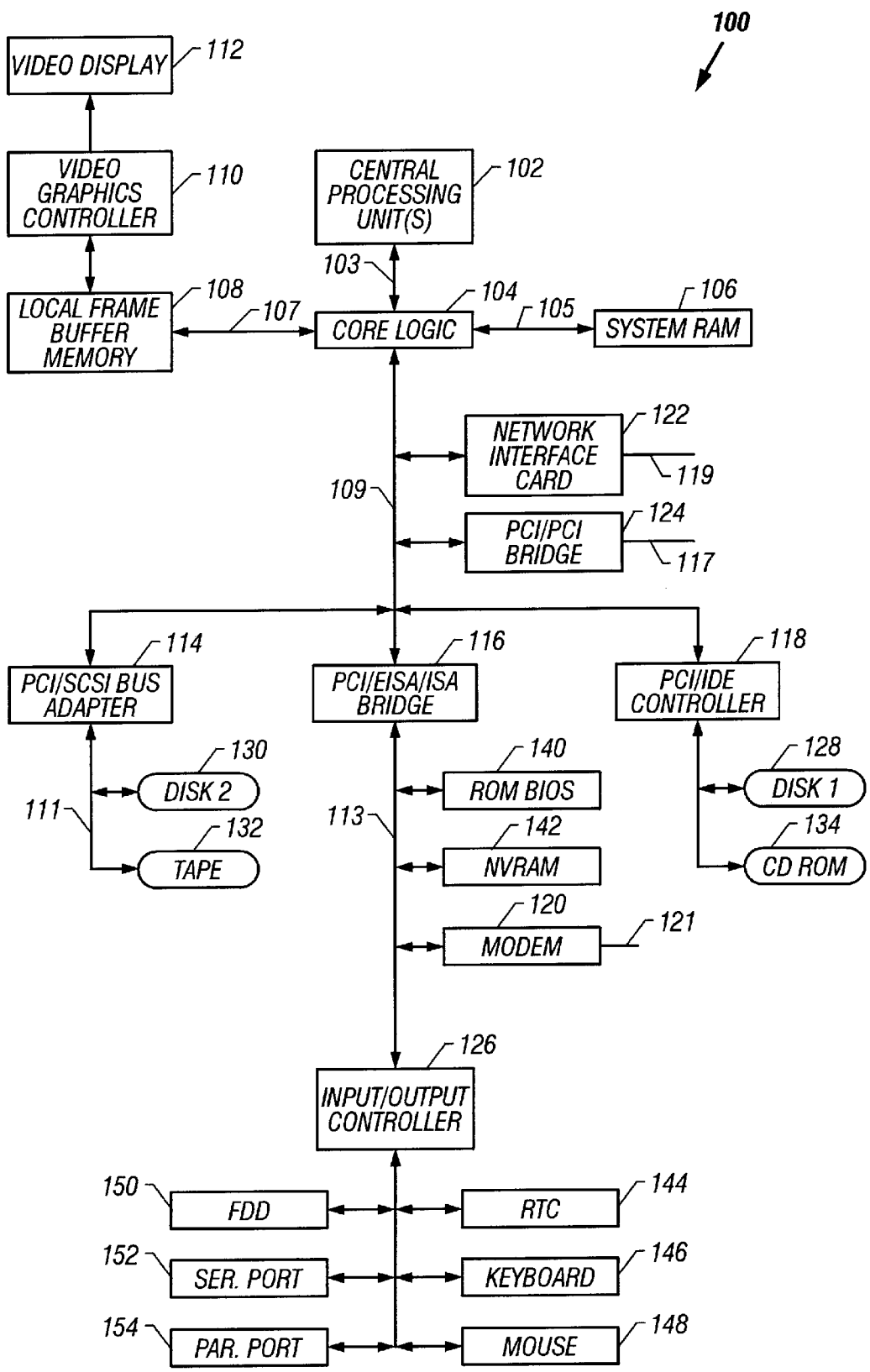
FIG. 1 is a schematic block diagram of a computer system having a primary PCI bus, an AGP bus.

The present invention is an apparatus and system for providing in a computer system a multiple use core logic chipset capable of implementing either a system area network interface and an AGP bus.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having an additional memory bus and increased memory bandwidth for NICs, PCI/PCI bridge, PCI/SCSI bridge, and the like. Computers used as network servers require merely simple two-dimensional ("2-D") graphics, thus the AGP bus is an overkill for this type of computer.

The AGP interface specification is a derivation or superset of the PCI interface specification and thus shares many common signal functions. Furthermore, the AGP bridge connects to the processor host bus and system memory bus through the computer system core logic chipset, thus it would be desirable to use the chipset logic and driver circuits for a system area network interface. An integrated circuit such as an application specific integrated circuit (ASIC), is external connection (pin or ball grid) limited but not gate (internal transistor) limited. Thus some of the external connections of the ASIC core logic chipset could be used for either an AGP interface or a system area network interface even if the signals for each interface had to be internally switched between the common external connections. This enhances the versatility of the core logic chipset and reduces the overall cost of computer systems, both workstation and network servers, by having a common multiple use core logic chipset that could be manufactured in large volumes so as to cover all types of computer configurations.

For illustrative purposes, a preferred embodiment of the present invention is described hereinafter for a computer system utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP interface standard or system area network interfaces.

The PCI specifications referenced above are readily available and are hereby incorporated by reference for all purposes. The AGP specification entitled "Accelerated Graphics Port Interface Specification Revision 1.0," dated Jul. 31, 1996, as referenced above is readily available from Intel Corporation, and is hereby incorporated by reference for all purposes. Further definition and enhancement of the AGP specification referenced above is more fully defined in "Compaq's Supplement to the 'Accelerated Graphics Port Interface Specification Version 1.0'," Revision 0.8, dated Apr. 1, 1997, and is hereby incorporated by reference for all purposes. Both of these AGP specifications were included as Appendices A and B in commonly owned co-pending U.S. patent application Ser. No. 08/853,289; filed May 9, 1997, entitled "Dual Purpose Apparatus, Method and System for Accelerated Graphics Port and Peripheral Component Interconnect" by Ronald Horan and Sompong P. Olarig, and which is hereby incorporated by reference for all purposes.

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system utilizing AGP and PCI buses, and a single system memory interface is illustrated. The computer system is generally indicated by the numeral 100 and comprises a central processing unit ("CPU") 102, core logic 104, system random access memory ("RAM") 106, a video graphics controller 110, a local frame buffer memory 108, a video display 112, a PCI/SCSI bus adapter 114, a PCI/EISA/ISA bridge 116, and a PCI/IDE controller 118. Single or multi-level cache memory (not illustrated) may also be included in the computer system 100 according to the current art of microprocessor computers. The CPU 102 may be a plurality of CPUs 102 in a symmetric or asymmetric multi-processor configuration.

The CPU 102 is connected to the core logic 104 through a host bus 103. The system RAM 106 is connected to the core logic 104 through a system memory bus 105. The video graphics controller 110 is connected to the local frame buffer memory 108, which is connected to the core logic 104 through an AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122, and a PCI/PCI bridge 124. Some of the PCI devices such as the NIC 122 and PCI/PCI bridge 124 may plug into PCI connectors on the computer system 100 motherboard. It is preferred that the core logic chipset 104, the AGP bus 107, the memory bus 105, and the PCI bus 109 reside on a printed circuit board (e.g., a motherboard).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134.

Figure 2:
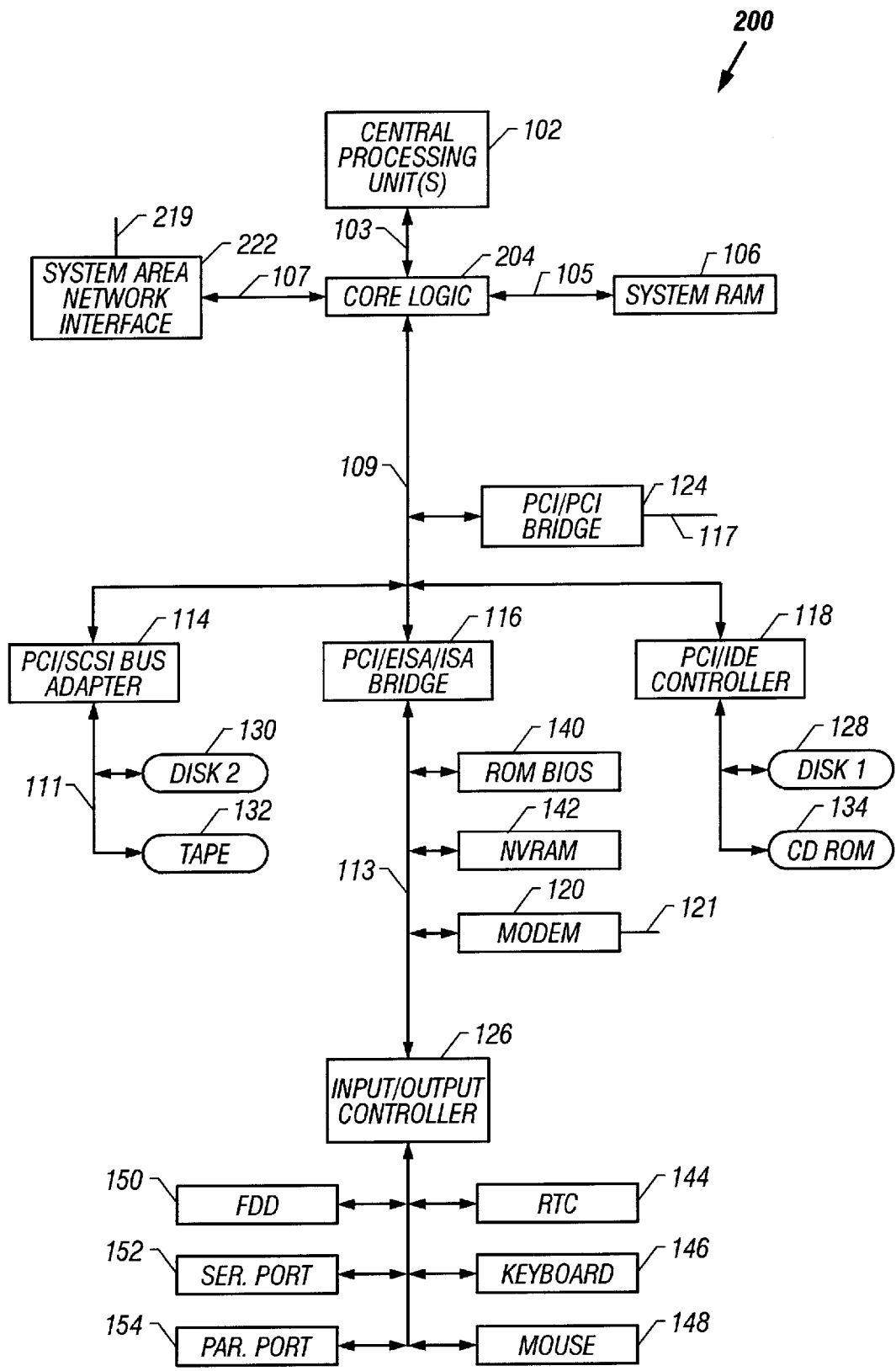
FIG. 2 is schematic block diagram of a computer system having a system area network interface according to the present invention.

FIG. 2 shows the preferred embodiment of the present invention. The preferred embodiment differs from the computer system shown in FIG. 1 in that the system area network interface 222 is attached to the AGP bus 107. The system area network interface 222 links the computer system 100 to the system area network 219. In the preferred embodiment, the system area network interface 222 is a PCI device (i.e., it behaves as a standard I/O device). This configuration is preferred because the system area network interface 222 would not share the AGP bus 107 with any other device—thereby providing increased network performance. Furthermore, in some computer systems, the AGP port gets higher priority over I/O signals from the PCI bus 109, further adding to overall performance of the system area network 219. A separate register in the core logic 204 (part of the AGP configuration) is used as a configuration signal to identify the system area network interface 222 as a standard PCI device needing cache coherency. Recall from the AGP specification that PCI is a subset of AGP and that PCI devices could be connected to AGP ports. In the preferred embodiment, the separate register is given a predetermined setting (i.e. a specific logic level) that indicates that a standard PCI device, such as the system area network interface 222 is attached. An standard AGP device could replace the system area network interface 222 (see FIG. 1) if the configuration signal (i.e., the special register) within the core logic chipset 204 is set to a different logic level. In the preferred embodiment, software would execute at machine startup that would poll the AGP bus 107 and identify the system area network interface 222 and configure the core logic 204 accordingly. After enumerating, scanning, walking, polling or otherwise probing the AGP bus 107, the software could set the special register (i.e., set the configuration signal) to proper logic level depending upon whether a PCI device or a system area network interface was found to be connected to the PCI bus 107. The setting of the configuration signal logic level takes place during power on self test. Alternatively, the configuration signal may be preset to specific logic level by use of a hardwire jumper setting (not shown) on the printed circuit board containing the core logic chipset 204. In either case, the logic level of the configuration signal is then detected during the configuration stage for the computer system. The preferred embodiment of the present invention is possible because of the dual functionality of the core logic chipset 204.

In an alternate embodiment, the system area network interface 222 is an AGP device that is simply attached to the AGP port 107. Obviously, this alternate embodiment does not need a separate register to identify the system area network interface 222 as a standard I/O device. This alternate embodiment is useful if the system area network interface 222 is capable of taking advantage of the bandwidth afforded by AGP.

Figure 3:
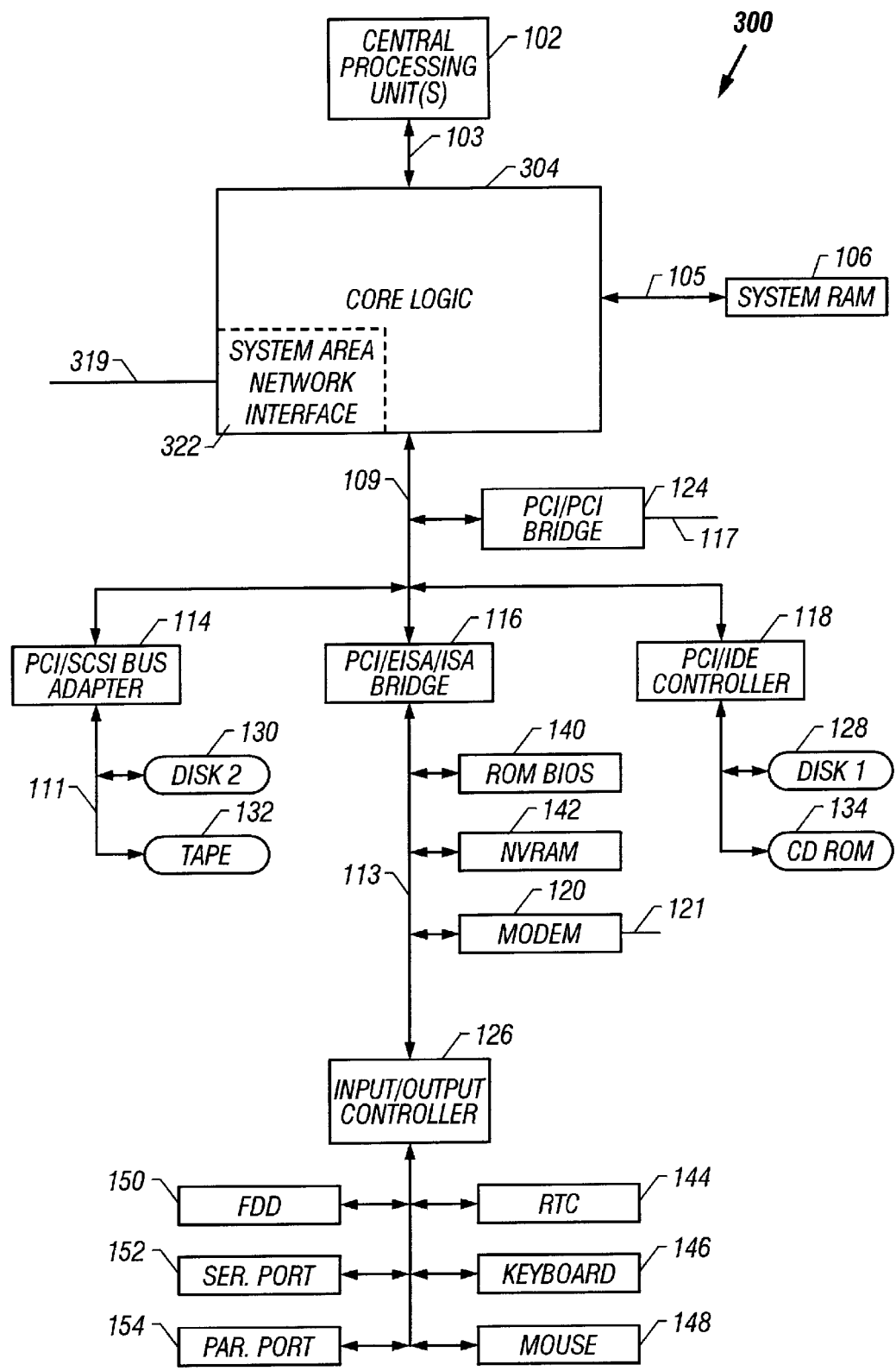
FIG. 3 is a schematic block diagram of a computer system having a system area network interface embedded within the core logic according to an alternate embodiment of the present invention.

A second alternate embodiment of the present invention is shown in FIG. 3. In this alternate embodiment, the system area network interface 322 is embedded into the core logic 304. The system area network 319 would then simply be connected to an adapter on the core logic 304 that would connect to the system area network interface 322 as shown in FIG. 3. In this alternate embodiment, the system area network interface could be a separate integrated circuit (IC), such as an application specific integrated circuit (ASIC) or a programmable logic array (PLA) integrated circuit. Such an embedded system area network interface 322 would take the place of the AGP bus 107. In yet another alternate embodiment, the system area network interface 322 would not take the place of the AGP bus 107, however, such an embodiment would necessitate an arbitration between the AGP bus 107, the system area network interface 322, and the PCI bus 109.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset having an AGP bus, said computer system comprising:

a central processing unit connected to a host bus;

said core logic chipset connected to said host bus;

system memory connected to said core logic chip set by a memory bus;

said core logic chipset configured as a first interface bridge between said host bus and said memory bus, and a second interface bridge between said host bus and a peripheral component interconnect bus connected to said core logic chipset;

said core logic chipset configurable as a third interface bridge between said host bus and said AGP bus;

said core logic chipset capable of accommodating an AGP device connected to said AGP bus when a configuration signal is set to a first logic level; and said core logic chipset capable of accommodating a PCI device connected to said AGP bus when said configuration signal is set to a second logic level.

2. The computer system of claim 1, further comprising an AGP device connected to said AGP bus.

3. The computer system of claim 1, further comprising an system area network interface connected to said AGP bus.

4. The computer system of claim 1, wherein the configuration signal is software controllable and is set to said first logic level when an AGP device is determined to be connected to said AGP bus.

5. The computer system of claim 1, wherein the configuration signal is software controllable and is set to said second logic level when a system area network interface is determined to be connected to said AGP bus.

6. The computer system of claim 1, wherein said host bus, said AGP bus, said memory bus and said core logic chipset are on a printed circuit board.

7. The computer system of claim 1, wherein said configuration signal logic level is determined by a hardwired jumper circuit on a printed circuit board containing said core logic chipset.

8. The computer system of claim 1, wherein the configuration signal logic level is determined by software.

9. The computer system of claim 8, wherein the configuration signal logic level is determined during power on self test of the computer system.

10. The computer system of claim 8, wherein the configuration signal logic level is determined during configuration of the computer system.

* * * * *